United States Patent [19]

Demenais

[11] 4,121,725

[45] Oct. 24, 1978

[54] TRUCK BODY

[75] Inventor: Claude L. Demenais, Breuillet, France

[73] Assignee: Societe Industrielle de Transports Automobiles, Paris, France

[21] Appl. No.: 828,756

[22] Filed: Aug. 29, 1977

Related U.S. Application Data

[63] Continuation of Ser. No. 656,187, Feb. 9, 1976, abandoned.

[51] Int. Cl.[2] ............................ B60P 1/04; B65F 3/00

[52] U.S. Cl. .................................... 214/83.3; 296/122

[58] Field of Search .................. 214/83.3, 503, 50, 51; 296/122, 51

[56] References Cited

U.S. PATENT DOCUMENTS

| | | | |
|---|---|---|---|
| 2,703,184 | 3/1955 | Barrett | 214/83.3 |
| 3,709,388 | 1/1973 | Neufeldt | 214/83.3 |
| 3,799,375 | 3/1974 | Herpich et al. | 214/83.3 |

FOREIGN PATENT DOCUMENTS

| | | | |
|---|---|---|---|
| 688,122 | 2/1953 | United Kingdom | 296/122 |

*Primary Examiner*—Albert J. Makay
*Assistant Examiner*—Lawrence E. Williams
*Attorney, Agent, or Firm*—Norman S. Blodgett; Gerry A. Blodgett

[57] ABSTRACT

Vehicle for receiving, transporting and discharging solid materials, which is provided with a swingable bin. The bin is capable of being withdrawn into an upper position which leaves the discharge opening completely free when discharging is to be carried out. The withdrawal is obtained by releasing the pivoting shaft of the bin and engaging a second shaft, situated at the rear of the bin, in bearings provided on the vehicle, in an upper position. This considerably lightens the vehicle, by dispensing with the conventional gate frame. A particularly advantageous use is for bins for the removal of solid domestic and industrial waste material.

3 Claims, 7 Drawing Figures

TRUCK BODY

This is a continuation of application Ser. No. 656,187 filed Feb. 9, 1976.

The present invention relates to vehicles for receiving or collecting solid materials and for the subsequent discharge of such materials. It concerns more particularly vehicles or appliances intended for the removal of refuse or various kinds of waste, before depositing them in a specific place. The invention provides more especially an improvement in the apparatus for receiving solid materials which is usually situated at the rear of vehicles of this type.

Although the improvement according to the invention can be used in vehicles used for many different kinds of material such as for example ores, metal parts, soil, sand, coal, wood, vegetables, fruit, grain, etc., one of its uses, particularly useful at the present time, aims at the improvement of systems for removing and discharging domestic or industrial solid refuse.

With the increasing development of modern society and the growth in populations, the handling of domestic waste becomes more and more important each day. Considerable tonnages of such waste are dealt with each day, which makes designers look for more and more elaborate solutions for the apparatus used for this work. An important point in the construction of vehicles for refuse removal is the closing of the rear portion of such appliances, where the materials collected are received. These must be quickly and easily admitted into the loading opening, to be pushed immediately towards the interior of the vehicle body. The assembly should be sealing-tight so that the refuse does not spread to the outside during transport. Furthermore the rear portion, in which the receiving opening is provided, should be capable of opening widely so as to permit the discharge of the materials when the moment arrives. In modern refuse bins, these conditions are provided by the presence at the rear of the vehicle of a gate frame capable of swinging generally in an upward direction. This frame, which closes the rear of the vehicle, constitutes a bulky and heavy part of the vehicle. In it the hooper or bin for receiving the refuse is mounted, and also the shutter which is used for pushing and compressing the material concerned. Furthermore the external sides of the frame carry the jacks for actuating these parts. In the normal position, the gate frame forms a large assembly overhung relatively to the rear axle of the vehicle. To discharge the vehicle, the frame is swung with its bin, shutter and jacks in an upward direction so as to expose completely the rear entrance of the body. In view of the weight and size of the frame, this swinging movement represents an expenditure of energy and time which is added to the permanent disadvantage, expensive from all points of view, constituted by the presence of the bulky mass of the frame at the rear of the vehicle.

The present invention provides an improvement which makes it possible at the time of discharge to leave the rear entrance of the vehicle body completely free without using a gate frame. It results in a considerable saving in weight and a reduction in the bulk of the rear part of the vehicle used for removing solid materials. As a result the construction is simpler and can be handled more easily. Lightened by dispensing with the gate frame, the vehicle can carry more material, which means a very appreciable improvement in efficiency.

Another important advantage, which results from lightening the weight and reducing the bulk, consists in the fact that the vehicle body according to the invention can easily be transferred from its vehicle to a platform used for transporting the waste material to a discharge site very far from the place where the waste was collected; this meets the modern tendency to use economical vehicles with a small radius of action, more particularly electrically operated vehicles, in cities for the collection of city refuse, and then to load the refuse on to platforms hitched to more powerful towing vehicles, to transport them to a distant site.

The vehicle body according to the invention for receiving, transporting and discharging solid materials, whose charging and discharging opening comprises a swingable hopper or bin, is characterized in that this bin is adapted to be withdrawn upwards into a position such that an entirely free passage exists between the interior of the vehicle body and the exterior, in the region where the bin was situated during the charging of the vehicle body.

Vehicles whose load-containing body comprises at the rear an upwardly pivotable bin are described in U.S. Pat. Nos. 2,703,184 and 3,456,821. However, in that prior art, the bin is mounted in a heavy rear gate or door fixed to the body and, to raise the bin to unmask the body discharge opening, it is necessary to pivot upwards the heavy gate itself. Now, according to the present invention there is no rear door, the bin being mounted directly on the side walls of the body, and it pivots alone into an upper position when it is necessary to open the rear of the vehicle body with a view to discharge. Furthermore, in the known apparatus the bin has one single shaft about which it can pivot. On the contrary, according to the present invention it is provided with two shafts, each at one of the end edges of the bin, one of the shafts being used in the lower position and the other in the upper position of the said bin.

Thus, according to the invention the withdrawing of the bin leaves completely free the space where the said bin is normally situated during the receiving and transporting of materials. This withdrawing operation is effected at the time when the collected materials are to be discharged, after which the bin is put back into its usual place.

To carry out the withdrawing operation according to the invention the usual connecting means which hold the front portion of the bin in a swingable manner on the interior of the vehicle are rendered capable of disengaging, that is to say capable of ceasing to connect the bin to the vehicle, at any instant desired by the operator; on the other hand the rear portion of the bin, the portion nearest the exterior of the vehicle, is provided with swingable connecting means adapted to be engaged in appropriate supports which are provided on the sides of the vehicle above the charging opening.

According to a particular feature of the invention, the withdrawing of the bin is effected by pivotably mounting it on the uprights of the vehicle in a region situated above the discharging opening, by means of a shaft with which the bin is provided at its rear end, situated towards the exterior of the vehicle.

In this form of embodiment, the charging bin comprises two parallel shafts: one at its front edge and the second at its rear edge. Each of the ends of the first shaft engages in a bearing situated at the end of a curved track one of which is provided at each side of the vehicle, in the lower portion of the latter, where the bin is usually pivotably mounted.

Each of the ends of the second shaft is capable of engaging in a bearing situated at the end of a curved track provided on or in each of the sides of the vehicle in an upper portion of the vehicle above the material reception opening. The position of the bearings in this upper portion is determined by the final position of the rear edge of the bin when the bin has been swung upwards in the conventional manner about its first shaft.

Besides the usual known means, such as jacks more particularly, for the swinging of the bin, the apparatus according to the present invention comprises appropriate means, operating only during the discharging of the vehicle, means which effect the disengagement of the first bin shaft from its bearings and the upward swinging of the front edge of the bin, that is to say the edge which carries this first shaft. This swinging takes place about the second shaft which has already been engaged in its bearings at the upper portion of the vehicle. The means for effecting these movements may be constituted more particularly with the use of jacks or other control devices.

The new apparatus also comprises preferably a locking system also, which may be of a type known per se, for fixing the second shaft of the bin in its bearings in the upper portion of the vehicle for the duration of the discharging of the material which has been collected within the vehicle body.

The invention will be shown, without implying any limitation of the scope of the said invention, by a description of particular forms of embodiment which are illustrated in the accompanying drawings.

FIG. 1 shows in a diagrammatic manner, in side elevation, the rear part of the body of a vehicle for receiving, transporting and discharging household refuse.

FIG. 2, similar to FIG. 1, corresponds to a second form of embodiment and shows the bin in its lower position.

FIG. 3 shows the same portion of the body as FIG. 2 but closed at the rear by the bin in a middle position.

FIG. 4 corresponds to the vehicle body shown in FIGS. 2 and 3, but with the bin in an upper position.

Figure 1:
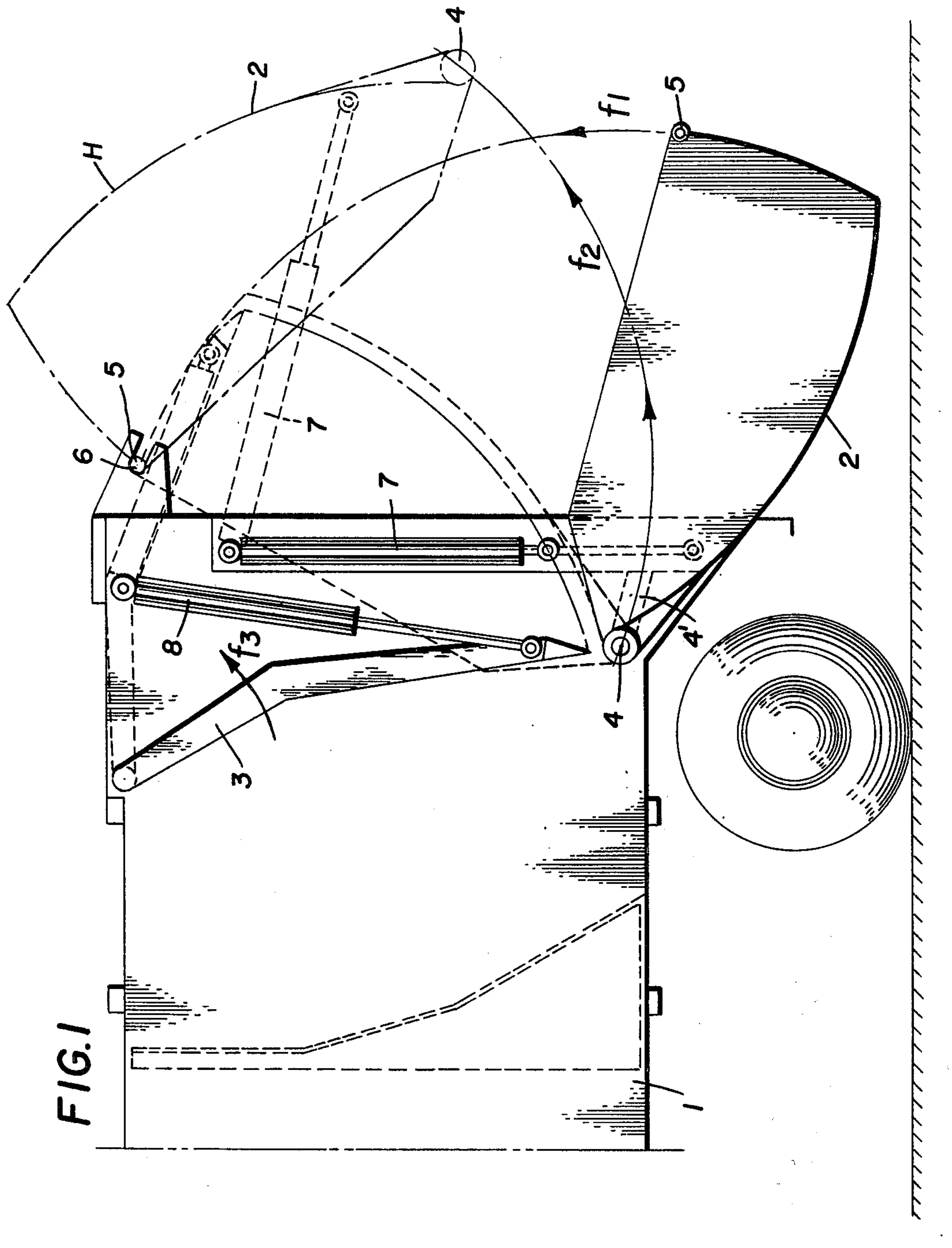

In the drawings, . . . 1 designates the box or body in which the refuse coming from the bin 2 is accumulated after being pushed by the shutter 3, when the bin has effected its usual swinging movement as shown by the arrow $f_1$ about its shaft 4. For this conventional operation, the shutter 3 follows the movement indicated by the arrow $f_3$.

The bin 2 comprises at its rear edge a second shaft 5 characteristic of the apparatus according to the present invention. Whereas the usual first shaft 4 is pivotable in its appropriate bearings in the lower portion of the sides of the vehicle it is capable — contrary to what is the case with known apparatus — of being disengaged from these bearings; this is effected for example by using a bearing means situated at the end of a curved track or groove 4'. Since the detachable or disengageable mounting of a shaft is known per se in the art there is no need to give the details of such a mounting here.

In the upper portion of the vehicle sides there are provided engaging means such as bearings 6 for the second shaft 5 of the bin. These bearings may be given the form of a curved track for example as in the case of 4'.

As the drawing and the preceding description show, the bin 2 and the shutter 3 and also the appropriate jacks are pivotably mounted directly on the uprights of the vehicle, and not on a special frame, as has been the case in corresponding vehicles in the state of the art.

The operation of the system comprising bin 2 and shutter 3 during the reception of refuse is the same as in conventional apparatus. It has been recalled hereinbefore, the movements shown by the arrows $f_1$ and $f_3$ being effected by means of the respective jacks 7 and 8. On the other hand, at the time of discharge, the operation is quite different from that used in vehicles of known types. At this time, with the shaft 5 of the bin 2 engaged and locked in the bearing 6, as is shown by the broken line between 4 and 6, the jack 7 comes into action in order to disengage the shaft 4 from the bearing 4' and bring it in the direction indicated by the arrow $f_2$ into the upper position, indicated by broken lines H.

It can be seen that following the movement indicated by the arrow $f_2$, the bin 2 is completely out of its normal position and the rear space between the end edge 11 of the vehicle and the shutter 3 is left entirely free, which allows the body 1 to be emptied in an easy manner.

After the discharge operation, the jack 7 comes into action again to return the front shaft 4 of the bin 2 into the bearing 4'. Then in order to return to the open position of the bin 2 (shown in full lines) the shaft 5 is disengaged from the bearing 6 after unlocking it. This operation can be carried out by hand or automatically by means of devices which are known per se and are not shown in the drawing.

Figure 2:
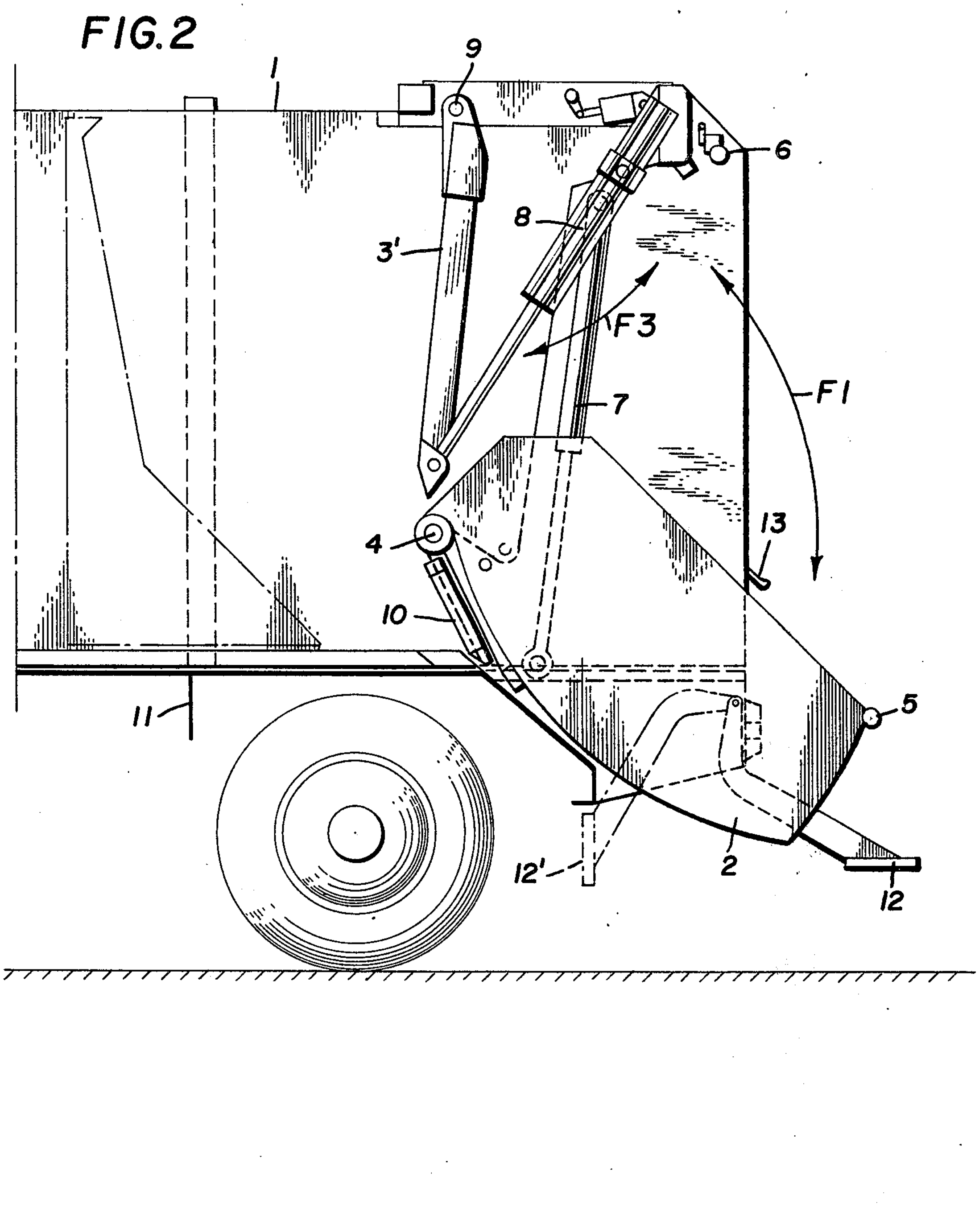

In FIG. 2, the shutter 3' which is journalled on two symmetrical pivot elements 9, for clearing the waste material contained in the bin 2 and compressing such material into the interior of the vehicle container or body 1, is straight in this case instead of having the angular form shown in FIG. 1 at the shutter 3.

The container or body 1 of FIG. 2 is carried by a vehicle chassis 11. At the rear end of the said chassis there is fixed a step or running-board 12 capable of swinging towards the front of the vehicle in the position 12' indicated in broken lines.

Figure 3:
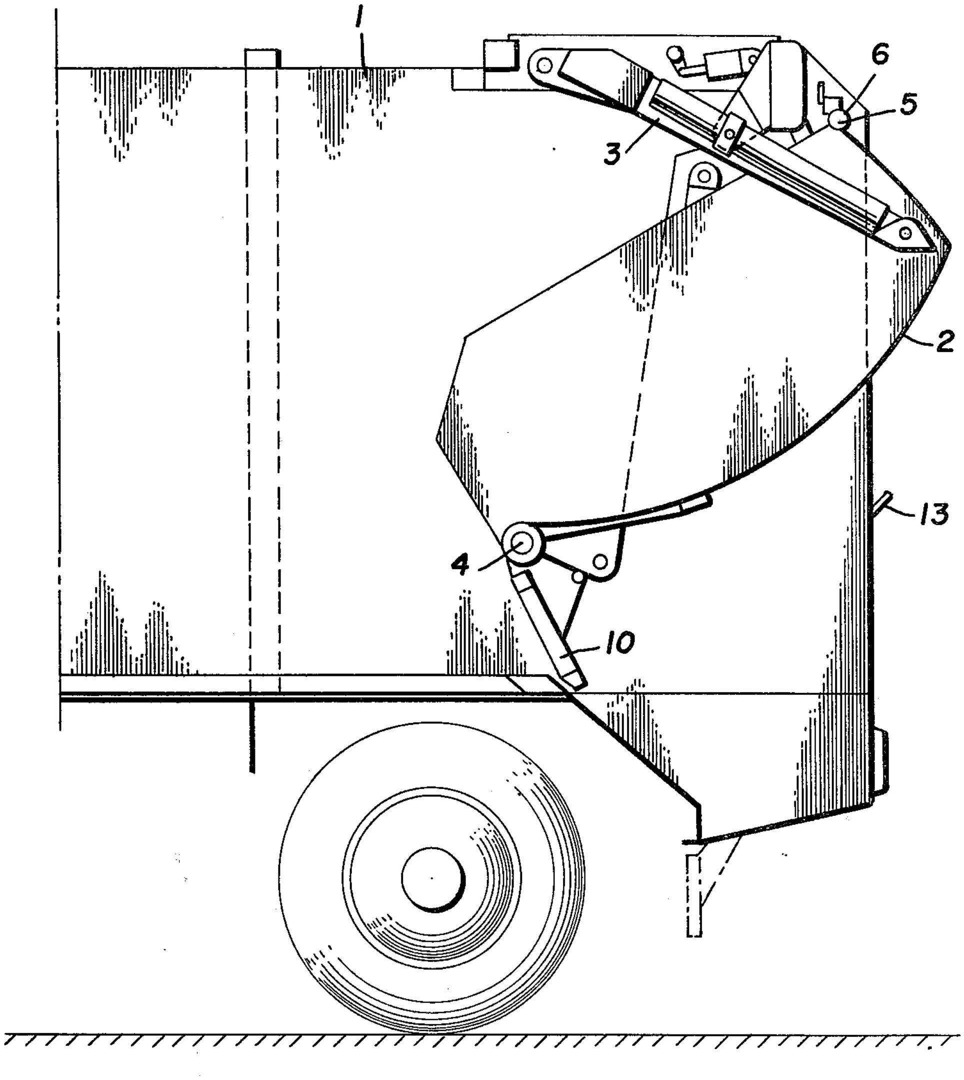
Figure 4:
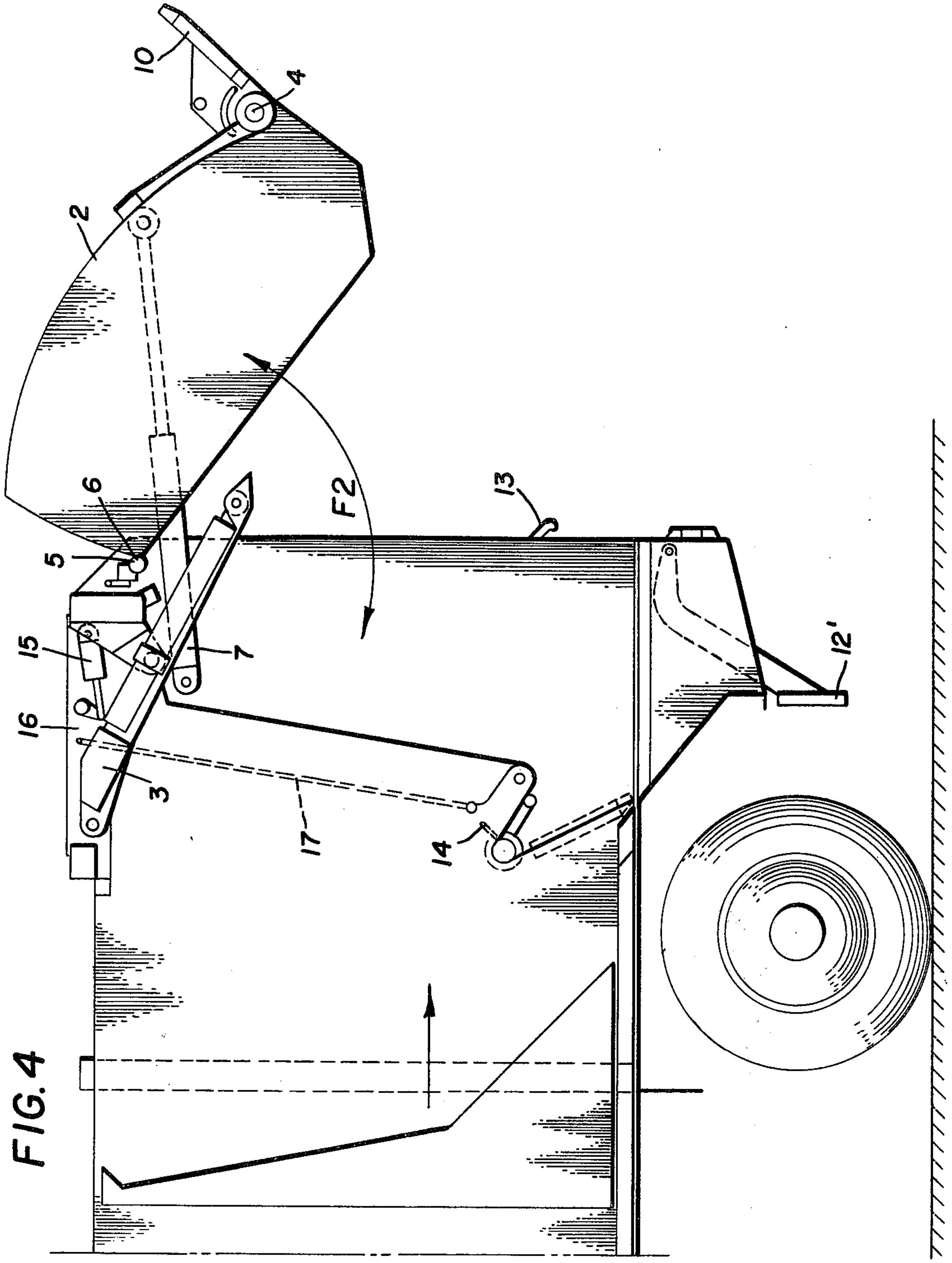
Figure 6:
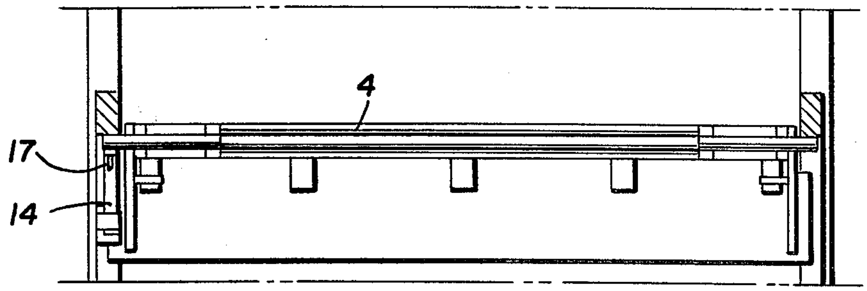
FIG. 6 shows in longitudinal section the connecting means which hold the bin at the interior of the body.

The shaft 4 which holds the bin 2 in the lower position, within the body 1, is locked in this position by means of a locking bolt 14 controlled by a rod 17, as can be seen more clearly in FIGS. 4 and 6. This shaft supports a shutter 10 for providing sealing-tightness at the lower region of the rear of the body 1 (FIGS. 2 and 3).

When the container or body 1 is filled, the jacks 7 and 8 are actuated to bring the bin 2 and the shutter 3 respectively into their positions shown in FIG. 3. This position of the bin 2, called the middle position here, effects the closing of the rear of the vehicle body 1. It involves the arrival of the rear shaft 5 of the bin 2 into alignment with the two symmetrical locking bolts 6, which are integral with the sides of the body 1. Controlled by a lever 13, the bolts 6 engage in the hollow ends of the shaft 5 (FIG. 7), thus forming a second axis of articulation for the bin 2 on the upper rear portion of the container or body 1.

As a result the body 1 is closed in sealing-tight manner. If it is detachable relatively to the chassis or supporting frame 11 of the vehicle, it can be stored and then transferred to another vehicle for transport of the waste far out of town.

The swinging of the bin 2 in an upward direction outside the body 1 according to the present invention in the position shown in FIG. 4 is obtained by the opening of the bolt 14 by means of the hydraulic jack 15 through the agency of the rod 17 and the gear 16, then by the action of the jacks 7 which give the bin 2 a movement in the direction of the arrow *f*2 about the shaft 5 and bolts 6. Thus, with the shutter 3 and bin 2 held in their upper position shown in FIG. 4, the rear of the body 1 is left completely free, which makes it easy to proceed with emptying the body, the step 12 having first of all been swung in a forward direction into the position 12'.

Figure 5:
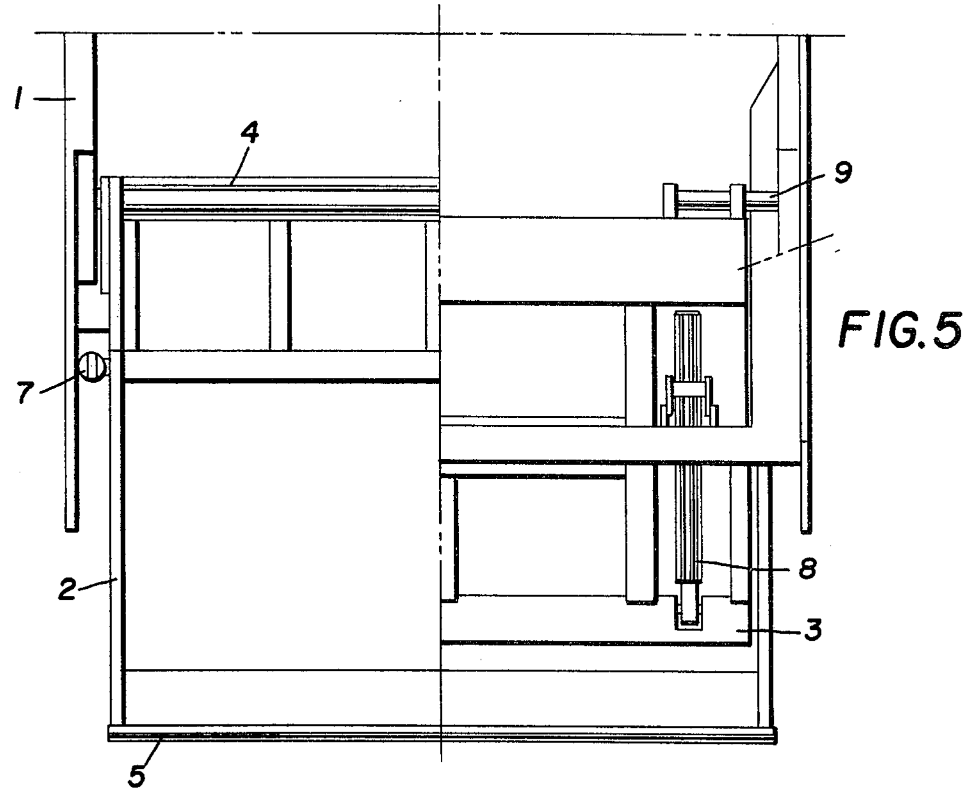
FIG. 5 is a plan view of the interior of the body shown in FIGS. 2 to 4.

Various conventional technical devices forming part of the structure of the apparatus according to the invention are shown in plan view in FIG. 5. In the left-hand half of this illustration there are shown the bin 2 with its two shafts 4 and 5, likewise the left-hand jack 7 for swinging the bin. The right-hand half shows the shutter 3', the right-hand journal 9 about which this shutter pivots, and also the right-hand jack 8 which operates the shutter. Of course a second jack 7 not shown here but identical to the left-hand jack, is situated at the right. The same applies to the pivots 9 and jacks 8, of which identical versions exist at the left.

Figure 7:
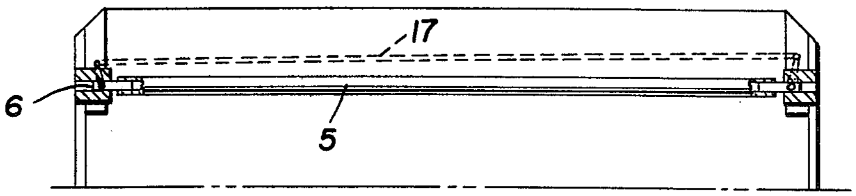
FIG. 7 is a longitudinal sectional view showing the connecting means used for holding the bin in the upper position, outside the body.

FIG. 6 shows in more detail the locking of the shaft 4, whereas FIG. 7 shows how the shaft 5 is fixed at the upper region of the vehicle body by the bolts 6 which engage into the hollow ends of the said shaft.

Because of the configuration of the parts used according to the present invention the increase in the load on the rear axle of the carrying vehicle is very slight this improvement is due to the fact that relatively to the position of the parts during material charging (FIG. 2) only the bin is swung upside down to leave the rear of the vehicle body 1 completely free when the said body has to be emptied.

I claim:

1. Truck body, comprising:

(a) a receptacle having bottom, top, and side walls with rear edges defining a rearwardly-directed opening, (b) a charging bin with a curved bottom wall and with side walls of generally crescent shape having straight edges joining the ends of the bottom wall and having a first set of hydraulic cylinders connecting the bin to the receptacle side walls, (c) a first pivot shaft extending from each side wall at one end of the bin, (d) a second pivot extending from each side wall at the other end of the bin, (e) complementary bearing means located adjacent the top and bottom portions of the rear edges of the side walls of the receptacle, the bearing means being vertically spaced to receive the first and second pivot shafts simultaneously on occasion in a travel mode, in which travel mode the bin closes the said receptacle opening, the upper bearing means and the second pivot shaft being disengageable by the said first set of hydraulic cylinders to move the bin to an upwardly-facing load mode, the lower bearing means and the first pivot shaft being disengageable by the said first set of hydraulic cylinders to move the bin to a downwardly-facing unload mode, and (f) a swingably shutter operative to swing through the bin and having a second set of hydraulic cylinders connecting the shutter to the receptacle wall, the first set of hydraulic cylinders consisting of a cylinder connected at one end to each side wall of the receptacle in the upper part thereof and connected at its other end to the bin adjacent the first pivot shaft, the cylinder being shortest in the travel mode and being extended in the load mode or the unload mode, and (g) locking means associated with the bearing means to release selectively the first pivot shaft or the second pivot shaft from its bearing to permit movement of the bin from the travel mode to either the unload mode or the load mode, respectively.

2. Truck body as recited in claim 1, wherein the said first and second pivot shafts consists of stub shafts whose ends are journaled on occasion in the said bearing means provided in the sides of the receptacle, the bin being provided at each end with an elongated shaft extending entirely across each end of its bottom wall and extending beyond the bin to provide the stub shafts.

3. Truck body as recited in claim 2, wherein each of the said bearing means is located in a curved track.

* * * * *